United States Patent [19]

Kitzmiller

[11] Patent Number: 5,698,241
[45] Date of Patent: Dec. 16, 1997

[54] ROTARY PLASTIC BLOW MOLDING MACHINE

[75] Inventor: Michael C. Kitzmiller, Fort Loramie, Ohio

[73] Assignee: Plastipak Packaging, Inc., Plymouth, Mich.

[21] Appl. No.: 699,447

[22] Filed: Aug. 19, 1996

[51] Int. Cl.⁶ .................. B29C 49/36; B29C 49/56
[52] U.S. Cl. .............. 425/532; 425/451; 425/540; 425/541
[58] Field of Search .................. 425/540, 541, 425/451, 451.5, 451.9, 532

[56] References Cited

U.S. PATENT DOCUMENTS

| | | | |
|---|---|---|---|
| 3,310,834 | 3/1967 | Simpson et al. | 425/152 |
| 3,496,599 | 2/1970 | Brown | 425/156 |
| 3,537,134 | 11/1970 | Raper et al. | 425/233 |
| 3,608,015 | 9/1971 | Martelli | 264/526 |
| 3,764,250 | 10/1973 | Waterloo | 425/453 |
| 3,785,761 | 1/1974 | Logomasini et al. | 425/451 |
| 3,986,807 | 10/1976 | Takegami et al. | 425/307 |
| 4,421,472 | 12/1983 | Martin, Jr. | 425/451 |
| 4,626,190 | 12/1986 | Hellmer | 425/541 |
| 4,650,412 | 3/1987 | Windstrup et al. | 425/540 |
| 4,834,641 | 5/1989 | Keyser | 425/540 |
| 4,998,873 | 3/1991 | Martin et al. | 425/451.5 |
| 5,240,718 | 8/1993 | Young et al. | 425/541 |

*Primary Examiner*—Robert Davis
*Attorney, Agent, or Firm*—Brooks & Kushman P.C.

[57] ABSTRACT

A rotary plastic blow molding machine (10) includes a rotary wheel (14) mounted on a base (12) and having a plurality of mold stations (30) with mold supports (34) that are mounted by inner and outer slide supports (32a,32b) and moved by an operating cam mechanism (56) in association with a lock mechanism (62) and an unlocking cam mechanism (64) to provide blow molding of an extruded parison. The inner and outer slide supports (32a,32b) are preferably aligned radially with respect to the rotational axis of the wheel (14) and the operating cam mechanism preferably includes a pair of gas springs (98) for providing uniform pressure in the closing of the mold supported by the mold supports (34). A mold recompression mechanism (128) removes mold closing pressure from the lock mechanism (62) prior to operation of the unlocking cam mechanism (64) in preparation for mold opening after completion of the blow molding cycle.

17 Claims, 6 Drawing Sheets

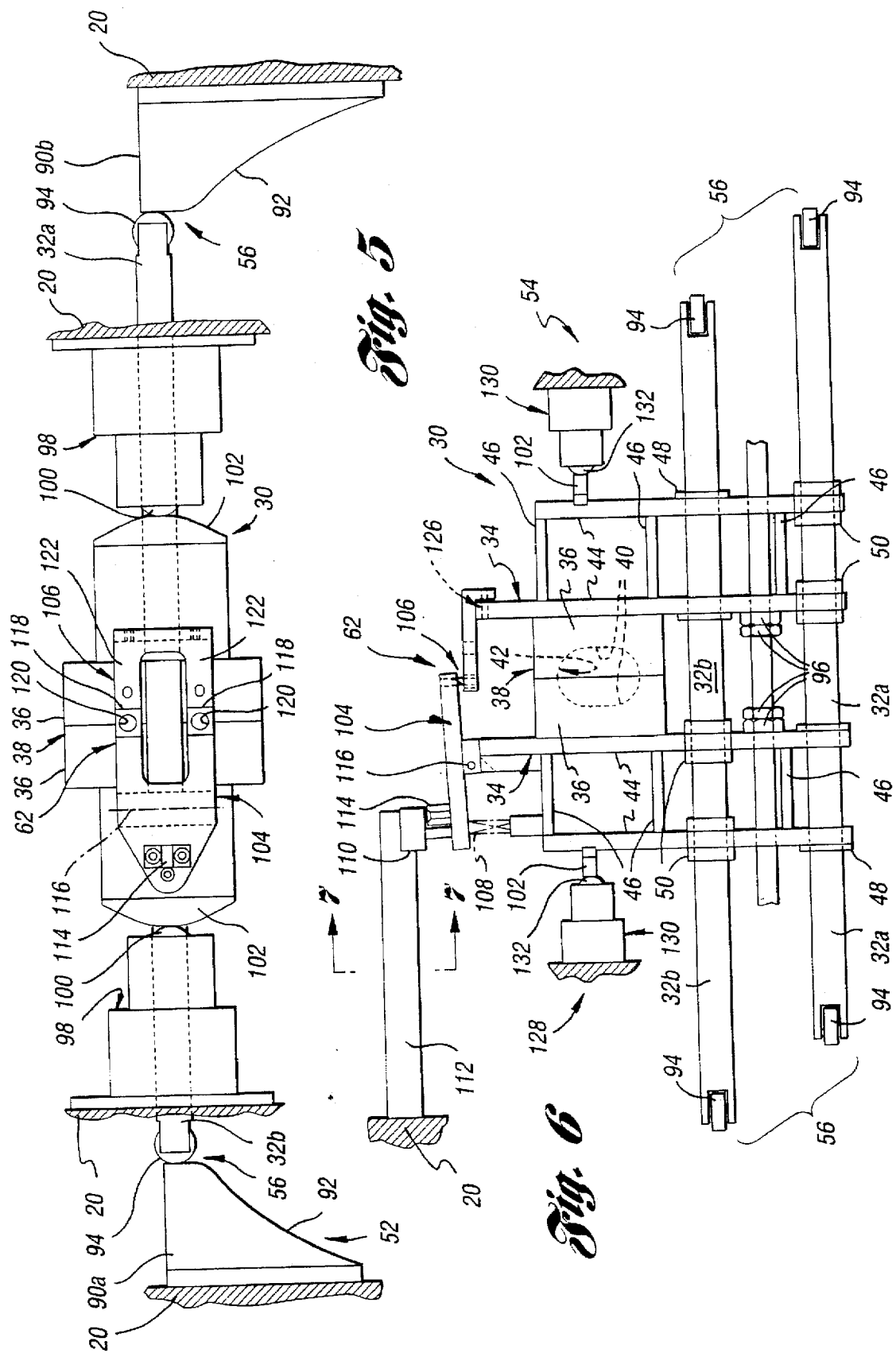

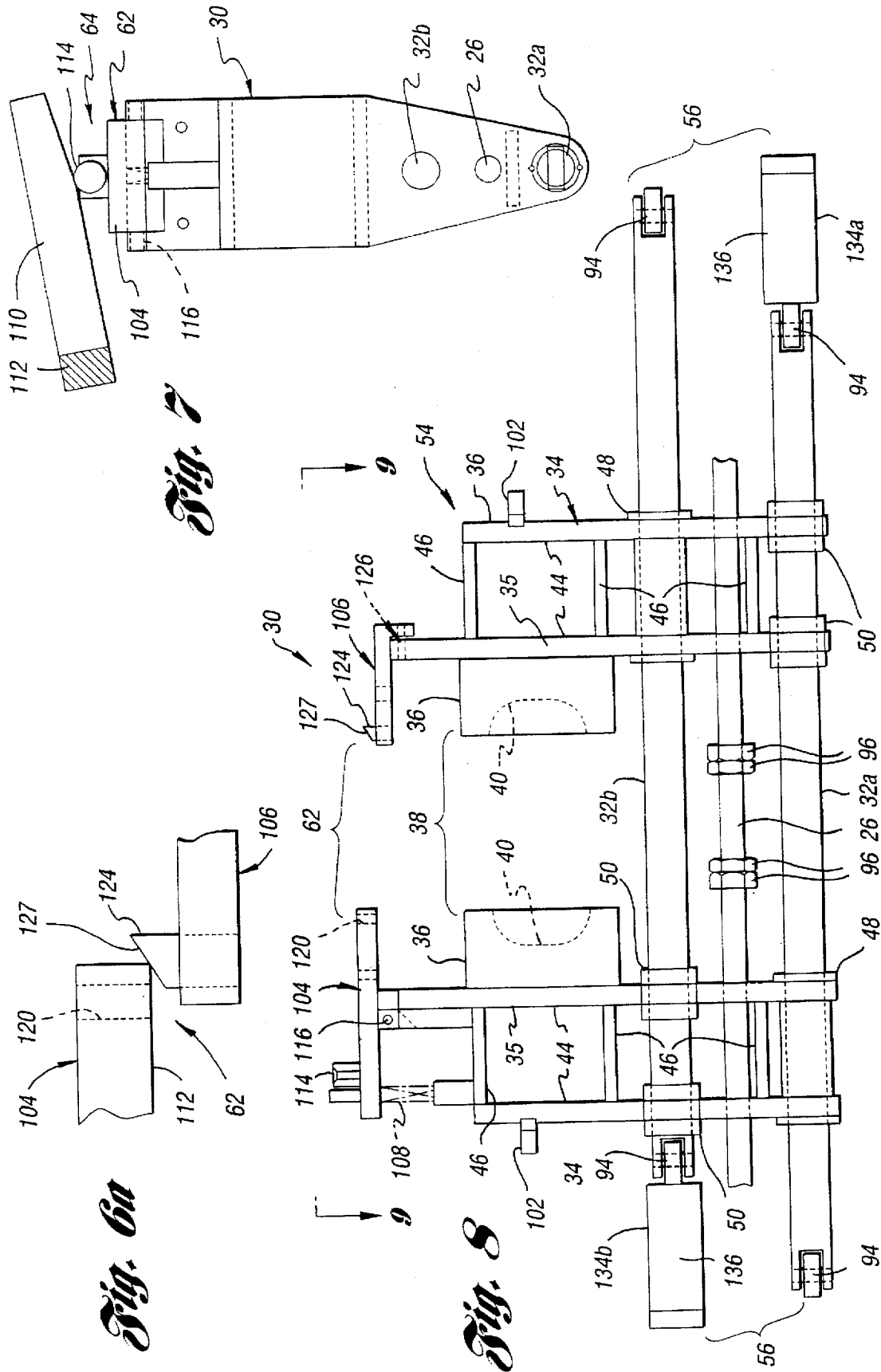

ROTARY PLASTIC BLOW MOLDING MACHINE

TECHNICAL FIELD

This invention relates to a rotary plastic blow molding machine.

BACKGROUND ART

Rotary plastic blow molding machines conventionally include a wheel mounted on a base for rotation about a horizontal rotational axis. The wheel includes a frame that supports a plurality of mold stations each of which has a pair of mold supports for mounting a pair of mold portions of a mold. The mold supports are movable between a mold open position where the mold portions are spaced from each other to receive an extruded plastic parison therebetween and a mold closed position where the mold portions define an enclosed cavity in which the parison is blow molded.

U.S. Pat. No. 5,240,718 Young et al discloses a rotary plastic blow molding machine wherein each mold station includes a pair of frame connecting members that have the same radial location with respect to the rotational axis. The pair of frame connecting members are located circumferentially about that axis with respect to each other and the associated pair of mold supports are mounted thereby for movement parallel to the rotational axis of the wheel between the mold open and closed positions.

Other rotary blow molding machines are disclosed by the prior art references cited in the aforementioned U.S. Pat. No. 5,240,718 Young et al including specifically U.S. Pat. No. 3,310,834 Simpson et al; U.S. Pat. No. 3,496,599 Brown; U.S. Pat. No. 3,537,134 Raper et al; U.S. Pat. No. 3,608,015 Martelli; U.S. Pat. No. 3,764,250 Waterloo; U.S. Pat. No. 3,785,761 Logomasini et al; U.S. Pat. No. 3,986,807 Takegami et al; U.S. Pat. No. 4,650,412 Windstrup et al; and U.S. Pat. No. 4,834,641 Kyser.

DISCLOSURE OF INVENTION

An object of the present invention is to provide an improved rotary plastic blow molding machine.

In carrying out the above and other objects of the invention, a rotary plastic blow molding machine constructed in accordance with the present invention includes a base and a wheel supported on the base for rotation about a horizontal rotational axis as well as including a drive for rotating the wheel. The wheel includes a frame having at least two frame portions spaced horizontally from each other along the rotational axis. A plurality of mold stations are mounted on the wheel about the rotational axis. Each mold station includes inner and outer slide supports that extend between the pair of frame portions at inner and outer locations, respectively, with respect to the rotational axis. The pair of slide supports are slidable with respect to the pair of frame portions along respective slide axes that extend parallel to each other and to the rotational axis. Each mold station includes a pair of mold supports having mold mounting portions for respectively mounting a pair of mold portions of a mold radially outward with respect to the rotational axis from the outer slide support. One mold support of each mold station is fixedly mounted on the inner slide support and slidably supported by the outer slide support, and the other mold support of each mold station is fixedly mounted on the outer slide support and slidably supported by the inner slide support. An operating cam mechanism of the machine moves the inner and outer slide supports along the slide axes thereof during rotation of the wheel to move the mold supports between a mold open position and a mold closed position. An extruder of the machine extrudes a hot plastic parison between the mold supports with the mold supports in the mold open position prior to subsequent movement of the mold supports to the mold closed position for blow molding within the mold mounted by these supports. Each mold station includes a lock mechanism mounted on the mold supports radially outward from the mold mounting portions thereof and movable from a locked position as the mold supports are moved by the cam operating mechanism to the mold closed position during the rotation of the wheel. An unlocking cam mechanism of the machine moves the lock mechanism to an unlocked position after the blow molding to allow movement of the pair of mold supports by the cam operating mechanism to the mold open position.

Locating the inner and outer slide supports at inner and outer locations with respect to the rotational axis allows the mold stations to be positioned farther inwardly in a radial direction than has heretofore been possible so as to permit construction of a much smaller wheel for any given number and size of the molds to be utilized. This advantage is best achieved by the preferred construction where the rotary plastic blow molding machine has the inner and outer slide supports aligned with each other in a radial direction with respect to the rotational axis.

The preferred construction of the rotary plastic blow molding machine is disclosed as having the operating cam mechanism including at least one gas spring for moving the mold supports to the mold closed position. Preferably, the operating cam mechanism includes a pair of gas springs for moving the mold supports to the mold closed position. In the preferred construction, the pair of gas springs of the operating cam mechanism are spaced from each other along the rotational axis with the mold stations of the wheel located along the rotational axis between the pair of gas springs.

The rotary plastic blow molding machine also preferably has its cam operating mechanism constructed to include a mold recompression mechanism for removing mold closing pressure from the lock mechanism prior to operation of the unlocking cam mechanism. This mold recompression mechanism preferably includes at least one gas spring and as disclosed includes a pair of gas springs. This pair of gas springs of the mold recompression mechanism are spaced from each other along the rotational axis with the mold stations of the wheel located along the rotational axis between the pair of gas springs of the mold recompression mechanism.

In its preferred construction, the rotary plastic blow molding machine has the lock mechanism of each mold station constructed to include a lock member mounted on one of the mold supports for movement between the locked and unlocked positions of the lock mechanism. Furthermore, the lock mechanism includes a keeper mounted on the other mold support and engaged by the lock member in the locked position to lock the mold supports in the mold closed position.

The preferred construction of the lock mechanism of each mold station includes a lock spring that biases the lock member thereof toward the locked position. The unlocking cam mechanism includes a cam that moves the lock member to the unlocked position against the bias of the lock spring after the blow molding to allow the movement of the pair of mold supports to the mold open position. The lock member of the lock mechanism preferably has an elongated construction including an intermediate portion having a pivotal mount on the associated mold support, a first end biased by the lock spring, and a second end that engages the keeper in the locked position to lock the mold supports in the mold closed position.

In its preferred construction, the lock mechanism of each mold station also includes an adjustable mount that adjustably positions the keeper on the associated support to control the mold locking force applied to the parison in the mold closed position with the lock mechanism in the locked position. The keeper also preferably has a cam surface that engages the locking end of the lock member as the cam operating mechanism moves the mold supports toward the closed position and such engagement cams the lock member against the bias of the lock spring until the mold supports are fully moved to the mold closed position whereupon the lock member is moved by the bias of the lock spring to the locked position in locking engagement with the keeper.

The preferred construction of the rotary plastic blow molding machine combines the components mentioned above by including a pair of gas springs for moving the mold support portions to the mold closed position, with the lock mechanism of each mold station including a lock member mounted on one of the mold supports for movement between the locked and unlocked position of the lock mechanism, with the lock mechanism of each mold station including a keeper mounted on the other mold support and engaged by the lock member in the locked position to lock the mold supports in the mold closed position, and with the cam operating mechanism including a mold recompression mechanism having a pair of gas springs for removing mold closing pressure from the lock mechanism prior to operation of the unlocking cam mechanism.

The objects, features and advantages of the present invention are readily apparent from the following detailed description of the best mode for carrying out the invention when taken in connection with the accompanying drawings.

BRIEF DESCRIPTION OF DRAWINGS

FIG. 5 is a view taken along the direction of line 5—5 in FIG. 4 to further illustrate the cam operating mechanism and the lock mechanism.

FIG. 6 is a view taken along the direction of line 6—6 of FIG. 1 at an opening station where an unlocking cam mechanism moves the lock mechanism to an unlocked position to permit opening of the associated mold station.

FIG. 6a is an enlarged partial view to illustrate the construction of the lock mechanism shown in FIG. 6.

FIG. 7 is a view taken along the direction of line 7—7 in FIG. 6 to further illustrate the manner in which the locking mechanism is unlocked to permit the opening of the mold station.

FIG. 8 is a view similar to FIG. 6 at a later stage after the cam operating mechanism has moved the unlocked mold station to the mold open position in preparation for the next blow molding cycle.

BEST MODE FOR CARRYING OUT THE INVENTION

Figure 1:
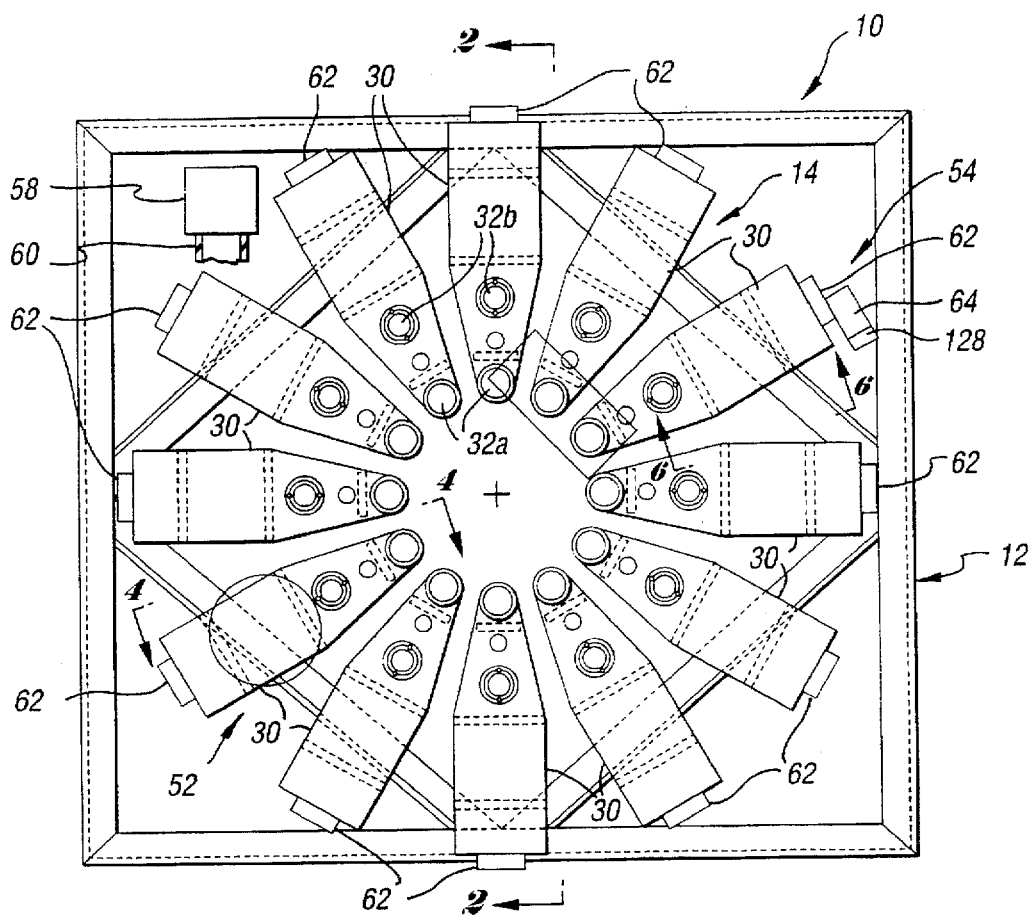
FIG. 1 is a side elevational view of a rotary plastic blow molding machine constructed in accordance with the present invention.

With reference to FIG. 1 of the drawings, a rotary plastic blow molding machine constructed in accordance with the present invention is generally indicated by 10. This blow molding machine 10 includes a base 12 and a rotary wheel 14 supported on the base for rotation about a horizontal rotational axis A in a manner that is hereinafter more fully described. A schematically indicated rotary drive 16 illustrated in FIG. 3 includes an electric motor and a splined connector 18 driven by the electric motor and extending along the rotational axis A to rotatively drive the wheel which in the view of FIG. 1 is in a counterclockwise direction.

Figure 3:
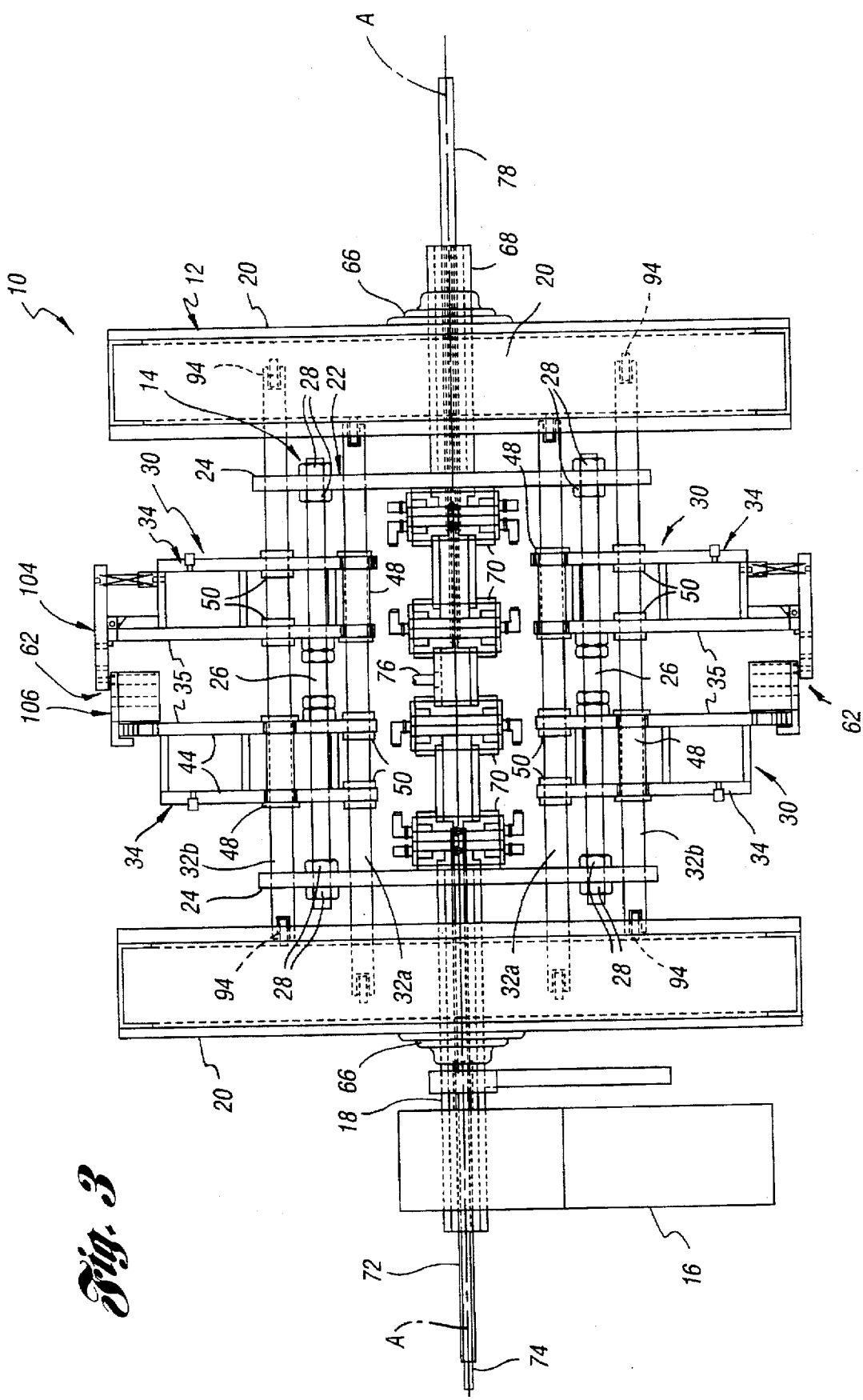
FIG. 3 is an elevational view taken generally in the same direction as FIG. 2 and further illustrates the construction of the rotary wheel.

As illustrated in FIG. 3, the base 12 includes spaced base portions 20 between which the wheel 14 is located. The wheel 14 includes a frame 22 having at least two frame portions 24 that are spaced horizontally from each other along the rotational axis and that are embodied by round metal plates extending perpendicular to the rotational axis A. Circumferentially spaced connector rods 26 extend parallel to the rotational axis A between the plate frame portions 24 and are secured thereto by a pair of nuts 28 at each end of each connector rod.

As illustrated by combined reference to FIGS. 1 and 13, a plurality of mold stations 30 are mounted on the wheel 14 about the rotational axis A and are located between the plate frame portions 24 as best shown in FIG. 3. Each mold station 30 has one of the connector rods 26 rigidifying the connection between the plate frame portions 24 and also includes inner and outer slide supports 32a and 32b that are respectively located at inner and outer locations with respect to the rotational axis A. The pair of slide supports 32a,b are slidable with respect to the frame portions 24 along respective slide axes that extend parallel to each other and to the rotational axis. More specifically, the inner slide support 32a is located radially inward from the associated connector rod 26 of the mold station 30 and the outer slide portion 32b is located radially outward from the associated connector rod of the mold station.

Figure 4:
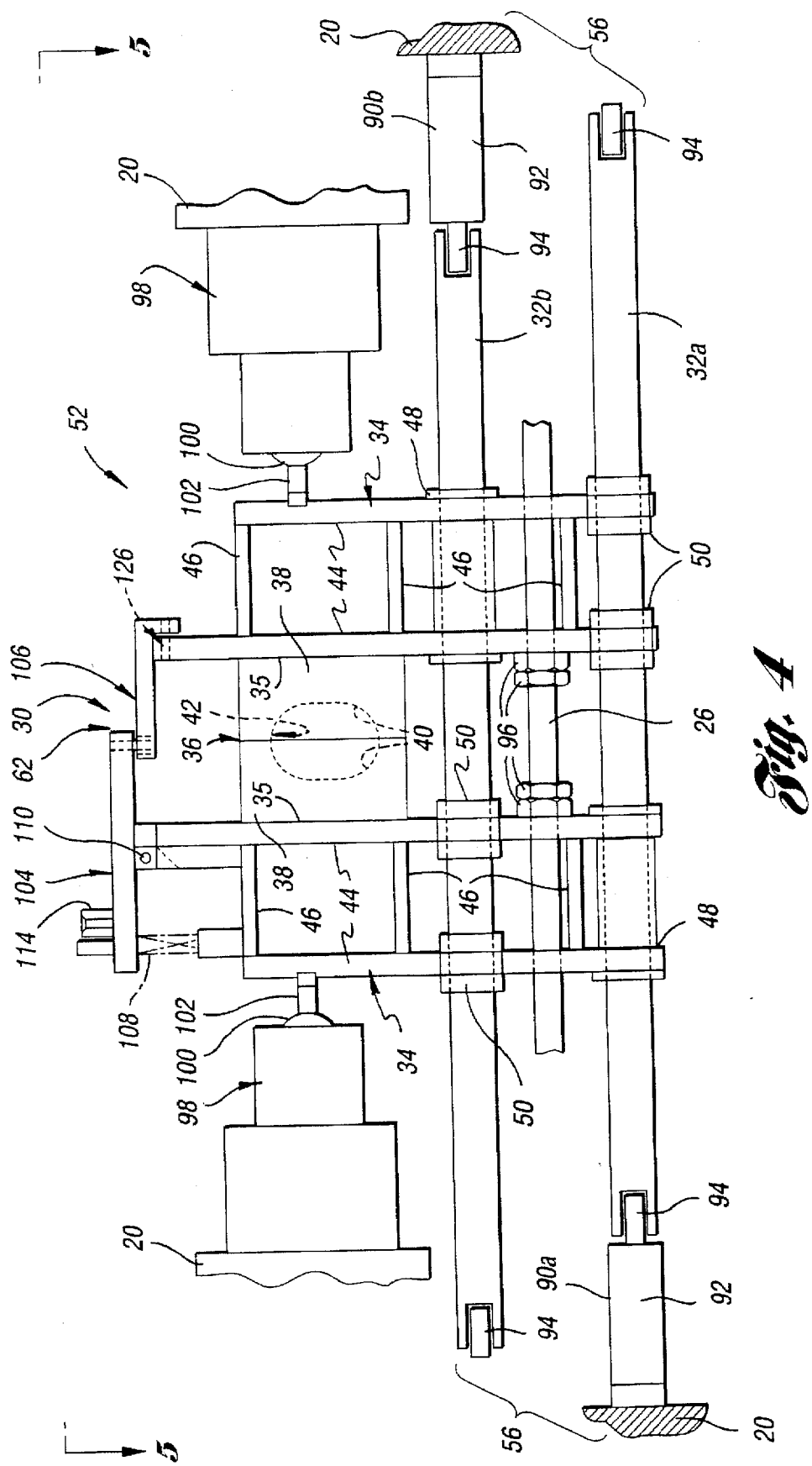
FIG. 4 is a view taken along the direction of line 4—4 in FIG. 1 to illustrate a closing station at which a cam operating mechanism closes mold supports of the wheel and at which a lock mechanism locks the mold supports in the mold closed position.
Figure 9:
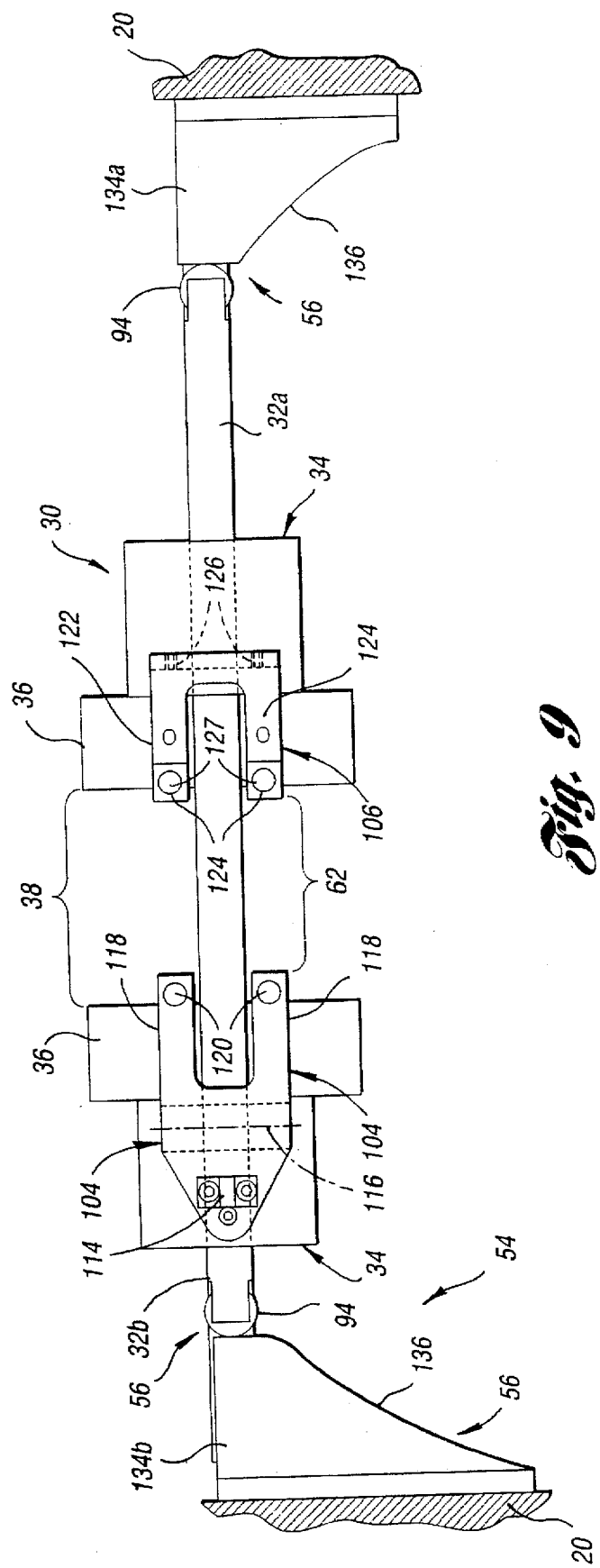
FIG. 9 is a view taken along the direction of line 9—9 in FIG. 8 to further illustrate the open mold station.

As best illustrated in FIGS. 6 and 7, each mold station 30 includes a pair of mold supports 34 having associated mold mounting portions 35 for respectively mounting a pair of mold portions 36 of a mold 38. These mold portions 36 have respective cavity portions 40 that define a cavity 42 in which the blow molding is performed as is hereinafter more fully described. As illustrated in FIGS. 3 and 4, each mold support 34 includes a pair of plates 44 that are spaced along the rotational axis of the wheel from each other and secured by axially extending plates 46. Furthermore, the two closest plates 44 between their radial inner and outer extremities embody the mold mounting portions 35 for mounting the associated mold 38 in any conventional manner as shown in FIGS. 4 and 8. One mold support 34 is secured by a locking collar 48 to the inner slide support 32a so as to move axially therewith while bushings 50 permit this mold portion to slide with respect to the outer slide support 32b. The other mold support 34 is fixed by a locking collar 48 to the outer slide support 32b but is permitted to slide by a pair of bearings 50 with respect with the inner slide support 32a.

As illustrated in FIG. 1, the machine 10 includes a closing station 52 and an opening station 54 located circumferentially at approximately diametrically opposite locations. At these closing and opening stations 52 and 54, an operating cam mechanism 56 illustrated in FIGS. 4,5 and 7,8,9 move the inner and outer slide supports 32a and 32b along the slide axes thereof during rotation of the wheel 14 to move the mold supports 34 between the mold open position of FIG. 8 and the mold closed position of FIG. 6 as hereinafter more fully described. An extruder 58 extrudes a hot plastic parison 60 of a tubular construction in a downward direction between the mold portions 36 of the open mold and subsequent movement of the mold supports to the mold closed position permits blow molding in the closed mold 38 as shown in FIG. 6.

Each mold station 30 includes a lock mechanism 62 as shown in FIGS. 4 and 6–8 mounted on the mold supports 34 radially outward from the mold mounting portions 35 thereof. Each lock mechanism 62 is movable by the cam operating mechanism 56 to a locked position as the mold supports 34 are moved by the cam operating mechanism to the mold closed position during the rotation of the wheel with the particular mold station adjacent the mold closing station 52. Adjacent the mold opening station 54 illustrated in FIG. 1, an unlocking cam mechanism 64 further illustrated in FIGS. 6 and 7 moves the lock mechanism 62 to an unlocked position after the blow molding to allow movement of the pair of mold supports 34 by the cam operating mechanism 56 to the mold open position in order to permit removal of the blow molded article in preparation for the next cycle.

The particular construction of the machine wheel 14 with the pair of mold supports 34 mounted on inner and outer slide supports 32a and 32b as described above permits relatively close spacing of the mold stations 30 as well as effective operation of the mold closing and opening during the blow molding cycle. It should also be noted that in the preferred construction the inner and outer slide supports 32a and 32b are aligned with each other in a radial direction with respect to the rotational axis A as illustrated in FIG. 1 so as to thereby provide the most advantageous construction permitting this close spacing of the mold stations. Such close spacing allows a relatively large amount of the mold stations for any given size of wheel. Furthermore, mounting the molds outwardly from the slide supports increases the size of molds that can be supported and operable within the mold station. Furthermore, the location of the lock mechanism 62 outwardly from the mounting portion 35 of the mold supports where the mold portions 36 are supported overcomes cantilever effects as far as providing the mold locking in cooperation with the support provided to the mold by the slide supports 32a and 32b inwardly from the mold.

To summarize the blow molding operation after the above general description prior to a more specific description of the machine construction, each cycle begins with the extruder 58 extruding the parison 60 downwardly as shown in FIG. 1. However, it should be appreciated that it is also possible to extrude the parison 60 upwardly as well. Although extrusion of the parison in a horizontal direction is theoretically possible, there can be gravity effects causing sagging in a transverse direction to the extrusion direction in such cases, which is why extrusion either downwardly or upwardly is preferred.

The downwardly extruded parison 60 is positioned between the mold portions 36 of the open mold as shown in FIG. 8 and upon movement thereof to the closing station 52, the cam operating mechanism 56 moves the mold station 30 to the mold closed position as shown in FIG. 4 for the blow molding within the closed mold. Continued rotation of the mold station counterclockwise as illustrated in FIG. 1 permits cooling of the blow molded article and movement thereof to the mold opening station 54 where the unlocking cam mechanism 64 unlocks the lock mechanism 62 as is hereinafter more fully described in connection with FIGS. 6 and 7 and where the cam operating mechanism 56 opens the mold to the position shown in FIG. 8 in preparation for the next cycle.

With reference to FIG. 3, each spaced base portions 20 includes a bearing 66 with the left bearing 66 supporting the splined connector 18 whose outer end is rotatively driven by the drive 16 and whose inner end extends inwardly to the adjacent frame portion 24 of the wheel 14 to provide its rotational support and driving. Similarly, the right bearing 66 supports a rotary connector 68 whose inner end supports the other frame portion 24 of the wheel for the rotation. Between the spaced frame portions 24, the wheel includes air and water manifolds 70 in fluid communication with the connectors 18 and 68 which have tubular constructions. Within the left tubular connector 18, a pipe 72 extends inwardly to the manifolds 70 with the space about its exterior cooperating with the connector thereabout to provide an inlet for water that provides cooling to the molds during the blow molding process in a conventional manner. Another pipe 74 of a smaller size extends inwardly through the pipe 72 with the annular space between these two pipes providing an inlet for pressurized air utilized in the blow molding process in a conventional manner. Furthermore, the interior of the pipe 74 provides for passage of electrical wiring which passes through a wheel entrance 76 to provide necessary electrical power as is hereinafter more fully described. Also, the right tubular connector 68 receives another pipe 78 with the annular space thereabout within this connector providing an outlet for the cooling water from the manifold 70. Furthermore, the interior of the pipe 78 provides for the introduction of lubrication air with oil.

Figure 2:
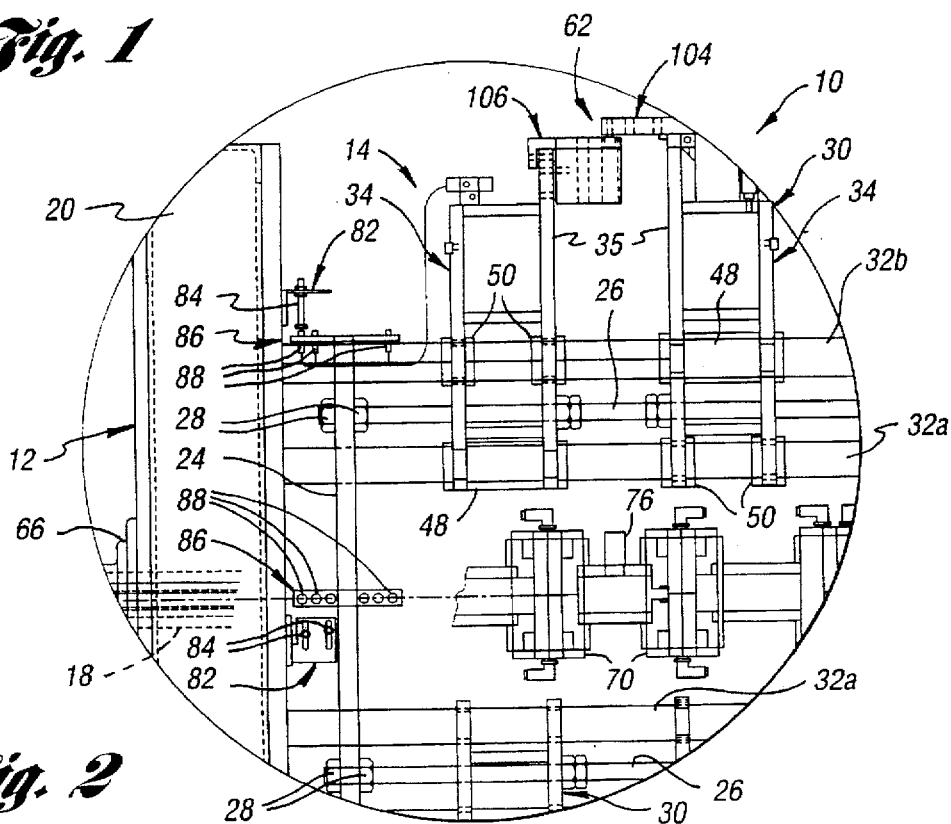
FIG. 2 is a partial elevational view taken along the direction of line 2—2 in FIG. 1 to illustrate gas and water manifolds as well as proximity valve controls of a rotary wheel of the machine.

With reference to FIG. 2, the electrical entrance 76 to the rotary wheel 14 energizes conventional proximity switches and any other conventional electrical circuitry necessary on the rotary wheel. Specifically, at appropriate circumferentially spaced locations about the location of wheel rotation, proximity switch actuator assemblies 82 are mounted on one of the base portions 20 and include suitable actuators 84. The rotary wheel 14 at one of its frame portions 24 mounts proximity switch assemblies 86 including proximity switches 88 for actuating the conventional electrical circuitry of the rotary wheel to provide blow pin insertion into the parison within each mold at the appropriate time, commencement and termination of the blow air, solenoid actuated ejection of the blow molded article from the mold after its opening and any other conventional electrical actuation desired during the blow molding process.

With reference to FIGS. 4 and 5 illustrating the closing station 52, the operating cam mechanism 56 includes cams 90a and 90b respectively mounted on the spaced base portions 20 of the machine base and each cam has a cam surface 92. Slide supports 32a and 32b on the rotary wheel 14 each have opposite ends including associated cam followers 94. At the closing station 52 as illustrated in FIGS. 4 and 5, the left cam 90a engages the cam follower 94 of the inner slide support 32a and the right cam 90b engages the cam follower 94 of the outer slide support 32b to move the slide supports in opposite directions in order to move the mold supports 34 supported thereby toward each other from the open position of FIG. 8 to the closed position illustrated in FIGS. 4 and 5. This mold closing encloses the parison within the mold 38 in preparation for the blow molding. Each mold station as illustrated in FIG. 8 has its connector rod 26 threaded and provided with two pairs of stop nuts 96 that are threaded against each other to provide accurate positioning of the mold supports 34 upon movement to the closed position of FIG. 4. It will be noted that the left cam 90a has a shorter length than the right cam 90b due to their inner and outer radial positioning with respect to the rotational axis in respective association with the inner and outer slide supports 32a and 32b.

With further reference to FIGS. 4 and 5, the operating cam mechanism 56 includes at least one and preferably a pair of gas springs 98 mounted by the spaced base portions 20. These gas springs 98 include pressurized gas biased cams 100 that engage cam followers 102 on the mold supports 34 to provide mold closing with a predetermined pressure. More specifically, the pair of gas springs 98 are spaced from each other along the rotational axis of the rotary wheel with the mold stations 30 of the wheel located along the rotational axis between the pair of gas springs. Such a construction provides effective operation of the gas springs in providing the cam actuated closing with a predetermined pressure.

As illustrated in FIGS. 6 and 7, the lock mechanism 62 of each mold station 30 includes a lock member 104 mounted on one of the mold supports 34 for movement between locked and unlocked positions. The lock mechanism 62 also includes a keeper 106 mounted on the other mold support 34 and engaged by the lock member 104 in the locked position as shown in FIG. 4 to lock the mold supports in the mold closed position. A lock spring 108 of the lock mechanism 62 biases the lock member 104 toward its locked position shown in FIG. 4. Furthermore, the unlocking cam mechanism 64 at the closing station 54 as schematically illustrated in FIG. 1 includes a cam 110 that is shown in FIGS. 6 and 7 as being mounted by a support 112 on one of the base portions 20. This cam 110 engages a cam follower 114 on the lock member 104 to move the lock member to its unlocked position against the bias of spring 108 after the blow molding to allow subsequent movement of the pair of mold supports to the mold open position.

With reference to FIG. 6, the lock member 104 has an elongated construction including an intermediate portion having a pivotal mount 116 on the associated mold support 34 for movement between its locked and unlocked position by the operation of the spring 108 and the cam 110. More specifically, one end of the lock member 104 is biased by the spring 108 and the other end of the lock member has a bifurcated construction including a pair of tines 118 each of which as shown in FIG. 5 includes an associated keeper opening 120. The keeper 106 is mounted on the other mold support 34 extending therefrom as shown in FIG. 5 with a bifurcated shape including tines 122 each of which supports an associated keeper member 124.

Keeper 106 includes an adjustable mount 126 that provides support of the keeper on the associated mold support 34 in an adjustable manner that permits movement toward and away from the lock member 104. This adjustment controls mold locking force applied to the parison in the mold closed position with the lock mechanism in the locked position. The adjustable mount 126 as illustrated is of the threaded type including a threaded member that extends between an inwardly extending leg of the keeper 106 and the outermost extremity of the associated mold support 34. Adjustable rotation of the threaded member that extends between the keeper and the associated mold support thus provides the movement of the keeper in an adjustable manner.

As illustrated by combined reference to FIGS. 6 and 6a, each keeper member 124 of the keeper has a cam surface 127 that engages the locking end of the lock member 104 as the cam operating mechanism moves the mold supports toward the closed position. Such engagement cams the locking member against the bias of the lock spring 108 shown in FIG. 6 until the mold supports are fully moved to the mold closed position with the keeper openings 120 aligned with the keeper members 124, whereupon the lock member is moved by the bias of the lock spring to the locked position in locking engagement with the keeper where the keeper members 124 are respectively received by the keeper openings 120 as illustrated in FIG. 4.

At the opening station 54 illustrated in FIG. 1, the operating cam mechanism includes a mold recompression mechanism 128 that removes the mold pressure before operation of the unlocking cam mechanism 64. Specifically, as shown in FIG. 6, the mold recompression mechanism 128 includes at least one and preferably a pair of gas springs 130 having associated cams 132 that engage the cam followers 102 on the mold supports 34. This engagement moves the mold portions 36 toward each other to remove the mold closing pressure from the locking mechanism 62 in preparation for unlocking. The pair of gas springs 130 of the mold recompression mechanism 128 are spaced from each other along the rotational axis A with the mold stations 30 of the wheel 14 located along the rotational axis between this pair of gas springs.

After the removal of the mold pressure from the lock mechanism 62 as described above, the unlocking mechanism 64 provides unlocking of the lock mechanism 62 by actuation of the cam 110 shown in FIG. 6 against the cam follower 116 to overcome the bias of the spring 108 and release the keeper 106 from the lock member 104. After such unlocking, inner and outer opening cams 134a and 134b have cam surfaces 136 that engage the cam followers 94 of the inner and outer slide supports 32a and 32b and thereby move the mold support portions 34 to the mold open position in order to allow ejection of the blow molded article and to prepare the associated mold station for the next blow molding cycle as the wheel rotation continues. It will be noted that the opening cam 134a for operating the inner slide support 32a has a shorter length than the opening cam 134b for opening the outer slide support 32b due to its closer proximity to the rotational axis of the wheel.

While the best mode for carrying out the invention has been disclosed in detail, those familiar with the art to which this invention relates will recognize various alternative designs and embodiments for practicing the invention as defined by the following claims.

What is claimed is:

1. A rotary plastic blow molding machine comprising: a base; a wheel supported on the base for rotation about a horizontal rotational axis; a drive for rotating the wheel; the wheel including a frame having at least two frame portions spaced horizontally from each other along the rotational axis; a plurality of mold stations mounted on the wheel about the rotational axis; each mold station including inner and outer slide supports that extend between the pair of frame portions at inner and outer locations, respectively, with respect to the rotational axis; the pair of slide supports being slidable with respect to the pair of frame portions along respective slide axes that extend parallel to each other and to the rotational axis; each mold station including a pair of mold supports having mold mounting portions for respectively mounting a pair of mold portions of a mold radially outward with respect to the rotational axis from the outer slide support; one mold support of each mold station being fixedly mounted on the inner slide support and slidably supported by the outer slide support and the other mold support of each mold station being fixedly mounted on the outer slide support and slidably supported by the inner slide support; an operating cam mechanism for moving the inner and outer slide supports along the slide axes thereof during rotation of the wheel to move the mold supports between a mold open position and a mold closed position; an extruder for extruding a hot plastic parison between the mold portions with the mold supports in the mold open position prior to subsequent movement of the mold supports to the mold closed position for blow molding in the mold supported thereby; each mold station including a lock mechanism mounted on the mold supports radially outward from the mold mounting portions thereof and movable to a locked position as the mold supports are moved by the cam operating mechanism to the mold closed position during the rotation of the wheel; and an unlocking cam mechanism for moving the lock mechanism to an unlocked position after the blow molding to allow movement of the pair of mold supports by the cam operating mechanism to the mold open position.

2. A rotary plastic blow molding machine as in claim 1 wherein the inner and outer slide supports are aligned with each other in a radial direction with respect to the rotational axis.

3. A rotary plastic blow molding machine as in claim 1 wherein the operating cam mechanism includes at least one gas spring for moving the mold supports to the mold closed position.

4. A rotary plastic blow molding machine as in claim 1 wherein the operating cam mechanism includes a pair of gas springs for moving the mold supports to the mold closed position.

5. A rotary plastic blow molding machine as in claim 4 wherein the pair of gas springs of the operating cam mechanism are spaced from each other along the rotational axis with the mold stations of the wheel located along the rotational axis between the pair of gas springs.

6. A rotary plastic blow molding machine as in claims 3, 4 or 5 wherein the cam operating mechanism includes a mold recompression mechanism for removing mold closing pressure from the lock mechanism prior to operation of the unlocking cam mechanism.

7. A rotary plastic blow molding machine as in claim 6 wherein the mold recompression mechanism includes at least one gas spring.

8. A rotary plastic blow molding machine as in claim 6 wherein the mold operating mechanism includes a pair of gas springs.

9. A rotary plastic blow molding machine as in claim 8 wherein the pair of gas springs of the mold recompression mechanism are spaced from each other along the rotational axis with the mold stations of the wheel located along the rotational axis between the pair of gas springs of the mold recompression mechanism.

10. A rotary plastic blow molding machine as in claim 1 wherein the lock mechanism of each mold station includes a lock member mounted on one of the mold supports for movement between the locked and unlocked positions of the lock mechanism, and the lock mechanism including a keeper mounted on the other mold support and engaged by the lock member in the locked position to lock the mold supports in the mold closed position.

11. A rotary plastic blow molding machine as in claim 10 wherein the lock mechanism of each mold station includes a lock spring that biases the lock member thereof toward the locked position, and the unlocking cam mechanism including a cam that moves the lock member to the unlocked position against the bias of the lock spring after the blow molding to allow the movement of the pair of mold supports to the mold open position.

12. A rotary plastic blow molding machine as in claim 11 wherein the lock member has an elongated construction including an intermediate portion having a pivotal mount on the associated mold support, a first end biased by the lock spring, and a second locking end that engages the keeper in the locked position to lock the mold supports in the mold closed position.

13. A rotary plastic blow molding machine as in claim 12 further including an adjustable mount that adjustably positions the keeper on the associated mold support to control the mold locking force applied to the parison in the mold closed position with the lock mechanism in the locked position.

14. A rotary plastic blow molding machine as in claim 12 wherein the keeper has a cam surface that engages the locking end of the lock member as the cam operating mechanism moves the mold supports toward the closed position and such engagement camming the lock member against the bias of the lock spring until the mold supports are fully moved to the mold closed position whereupon the lock member is moved by the bias of the lock spring to the locked position in locking engagement with the keeper.

15. A rotary plastic blow molding machine as in claim 1 wherein the operating cam mechanism includes a pair of gas springs for moving the mold support portions to the mold closed position, the lock mechanism of each mold station including a lock member mounted on one of the mold supports for movement between the locked and unlocked positions of the lock mechanism, the lock mechanism of each mold station including a keeper mounted on the other mold support and engaged by the lock member in the locked position to lock the mold supports in the mold closed position, and the cam operating mechanism including a mold recompression mechanism having a pair of gas springs for removing mold closing pressure from the lock mechanism prior to operation of the unlocking cam mechanism.

16. A rotary plastic blow molding machine comprising: a base; a wheel supported on the base for rotation about a horizontal rotational axis; a drive for rotating the wheel; the wheel including a frame having at least two frame portions spaced horizontally from each other along the rotational axis; a plurality of mold stations mounted on the wheel about the rotational axis; each mold station including inner and outer slide supports that extend between the pair of frame portions and are aligned radially with respect to the rotational axis; the pair of slide supports being slidable with respect to the pair of frame portions along respective slide axes that extend parallel to each other and to the rotational axis; each mold station including a pair of mold supports having mold mounting portions for respectively mounting a pair of mold portions of a mold radially outward with respect to the rotational axis from the outer slide support; one mold support of each mold station being fixedly mounted on the inner slide support and slidably supported by the outer slide support and the other mold support of each mold station being fixedly mounted on the outer slide support and slidably supported by the inner slide support; an operating cam mechanism for moving the inner and outer slide supports along the slide axes thereof during rotation of the wheel to move the mold supports between a mold open position and a mold closed position; the operating cam mechanism including a pair of gas springs spaced from each other along the rotational axis with the mold stations of the wheel located along the rotational axis between the pair of gas springs and having the mold supports thereof moved by the pair of gas springs to the mold closed position; an extruder for extruding a hot plastic parison between the mold portions with the mold supports in the mold open position prior to subsequent movement of the mold supports to the mold closed position for blow molding in the mold supported thereby; each mold station including a lock mechanism mounted on the mold supports radially outward from the mold mounting portions thereof and movable to a locked position as the mold supports are moved by the cam operating mechanism to the mold closed position during the rotation of the wheel; the lock mechanism of each mold station including a lock member mounted on one of the mold supports for movement between the locked position and an unlocked position of the lock mechanism; the lock mechanism of each mold station including a keeper mounted on the other mold support and engaged by the lock member in the locked position to lock the mold supports in the mold closed position; the lock mechanism including a lock spring that biases the lock member thereof toward the locked position; an unlocking cam mechanism including a cam that moves the lock member of the lock mechanism to the unlocked position after the blow molding to allow movement of the pair of mold supports by the cam operating mechanism to the mold open position; and the cam operating mechanism including a mold recompression mechanism having a pair of gas springs for removing mold closing pressure from the lock mechanism prior to operation of the unlocking cam mechanism.

17. A rotary plastic blow molding machine comprising: a base; a wheel supported on the base for rotation about a horizontal rotational axis; a drive for rotating the wheel; the wheel including a frame having at least two frame portions spaced horizontally from each other along the rotational axis; a plurality of mold stations mounted on the wheel about the rotational axis; each mold station including inner and outer slide supports that extend between the pair of frame portions and are aligned radially with respect to the rotational axis; the pair of slide supports being slidable with respect to the pair of frame portions along respective slide axes that extend parallel to each other and to the rotational axis; each mold station including a pair of mold supports having mold mounting portions for respectively mounting a pair of mold portions of a mold radially outward with respect to the rotational axis from the outer slide support; one mold support of each mold station being fixedly mounted on the inner slide support and slidably supported by the outer slide support and the other mold support of each mold station being fixedly mounted on the outer slide support and slidably supported by the inner slide support; an operating cam mechanism for moving the inner and outer slide supports along the slide axes thereof during rotation of the wheel to move the mold supports between a mold open position and a mold closed position; the operating cam mechanism including a pair of gas springs spaced from each other along the rotational axis with the mold stations of the wheel located along the rotational axis between the pair of gas springs and having the mold supports thereof moved by the pair of gas springs to the mold closed position; an extruder for extruding a hot plastic parison between the mold portions with the mold supports in the mold open position prior to subsequent movement of the mold supports to the mold closed position for blow molding in the mold supported thereby; each mold station including a lock mechanism mounted on the mold supports radially outward from the mold mounting portions thereof and movable to a locked position as the mold supports are moved by the operating cam mechanism to the mold closed position during the rotation of the wheel; the lock mechanism of each mold station including an elongated lock member having a first and a second end as well as an intermediate portion having a pivotal mount on one of the mold supports for movement between the locked position and an unlocked position of the lock mechanism; a lock spring that biases the first end of the lock member to the locked position; the lock mechanism of each mold station including a keeper mounted on the other mold support and engaged by the second locking end of the elongated lock member in the locked position to lock the mold supports in the mold closed position; the keeper having a cam surface that engages the second end of the lock member as the mold supports are moved toward the closed position and such engagement camming the lock member against the bias of the lock spring until the mold supports are in the fully closed position whereupon the lock member is moved by the bias of the lock spring to the locked position in locking engagement with the keeper; an unlocking cam mechanism having a cam for engaging the first end of the locking member to move the lock member against the bias of the lock spring to the unlocked position after the blow molding to allow movement of the pair of mold supports by the cam operating mechanism to the mold open position; and the cam operating mechanism including a mold recompression mechanism having a pair of gas springs for removing mold closing pressure from the lock mechanism prior to operation of the unlocking cam mechanism.

* * * * *